(12) United States Patent
Tatara (10) Patent No.: US 8,385,612 B2
(45) Date of Patent: Feb. 26, 2013

(54) FINGERPRINT IMAGE BACKGROUND DETECTION APPARATUS AND DETECTION METHOD

(75) Inventor: Tetsuo Tatara, Tokyo (JP)

(73) Assignee: NEC Corporation, Tokyo (JP)

( * ) Notice: Subject to any disclaimer, the term of this patent is extended or adjusted under 35 U.S.C. 154(b) by 1024 days.

(21) Appl. No.: 11/994,220

(22) PCT Filed: Jun. 30, 2006

(86) PCT No.: PCT/JP2006/313063
§ 371 (c)(1),
(2), (4) Date: Dec. 28, 2007

(87) PCT Pub. No.: WO2007/004537
PCT Pub. Date: Jan. 11, 2007

(65) Prior Publication Data
US 2009/0123040 A1    May 14, 2009

(30) Foreign Application Priority Data

Jun. 30, 2005    (JP) .................................. 2005-192025

(51) Int. Cl.
*G06K 9/00* (2006.01)
(52) U.S. Cl. ....................................................... 382/124
(58) Field of Classification Search ........... 382/124–127
See application file for complete search history.

(56) References Cited

U.S. PATENT DOCUMENTS

| 5,177,792 A * | 1/1993 | Morita ........................... 382/125 |
| 7,020,591 B1 * | 3/2006 | Wei et al. ........................... 703/2 |
| 2003/0039382 A1 | 2/2003 | Yau et al. |
| 2005/0100200 A1 | 5/2005 | Abiko et al. |
| 2005/0123177 A1 * | 6/2005 | Abiko ........................... 382/124 |

FOREIGN PATENT DOCUMENTS

| JP | 01-158577 A | 6/1989 |
| JP | 10-255051 A | 9/1998 |
| JP | 10-334237 A | 12/1998 |
| JP | 11-025257 A | 1/1999 |
| JP | 2000-076435 A | 3/2000 |
| JP | 2002-298126 A | 10/2002 |
| JP | 2003-044856 A | 2/2003 |
| JP | 2003-271960 A | 9/2003 |

* cited by examiner

*Primary Examiner* — Alex Liew
(74) *Attorney, Agent, or Firm* — Dickstein Shapiro LLP

(57) ABSTRACT

Even if streak-like noise or streaks caused by dragging which can be hardly distinguished from upheaval lines exist, background regions and impressing regions are separated from each other without being affected by existence of streaks. A fingerprint image background detection apparatus which discriminates background regions and impressing regions in an input fingerprint image includes impressing feature extraction means 22 which finds a pixel value variation quantity in a direction parallel to streak-like noise or streaks caused by dragging every small region obtained by dividing the input fingerprint image, tentative impressing region decision means 23 which judges impressing regions by comparing a pixel value variation quantity of every small region found by the impressing feature extraction means with a threshold, and impressing region shaping means 24 which shapes the impressing regions judged by the tentative impressing region decision means to obtain a convex shaped figure and obtains regions other than the impressing regions as background regions.

17 Claims, 8 Drawing Sheets

| 0 | 0 | 0 | 0 | 1 | 1 | 1 | 1 | 1 | 1 |
|---|---|---|---|---|---|---|---|---|---|
| 0 | 0 | 0 | 0 | 0 | 0 | 1 | 1 | 1 | 1 |
| 1 | 1 | 0 | 0 | 0 | 0 | 0 | 0 | 1 | 1 |
| 1 | 1 | 1 | 1 | 0 | 0 | 0 | 0 | 0 | 0 |
| 1 | 1 | 1 | 1 | 1 | 1 | 0 | 0 | 0 | 0 |
| 0 | 1 | 1 | 1 | 1 | 1 | 0 | 0 | 0 | 0 |
| 0 | 0 | 1 | 0 | 1 | 1 | 1 | 0 | 0 | 0 |
| 0 | 0 | 0 | 1 | 1 | 1 | 1 | 1 | 1 | 1 |
| 0 | 0 | 0 | 0 | 1 | 1 | 0 | 0 | 0 | 1 |
| 0 | 0 | 0 | 0 | 0 | 0 | 1 | 0 | 1 | 1 |

DECISION LINE (1) — row 3
DECISION LINE (2) — row 6
DECISION LINE (3) — row 9
DECISION LINE (4) — column 3
DECISION LINE (5) — column 5
DECISION LINE (6) — column 7

FIG.9

FINGERPRINT IMAGE BACKGROUND DETECTION APPARATUS AND DETECTION METHOD

TECHNICAL FIELD

The present invention relates to a fingerprint image background detection apparatus, and detection method, used in a fingerprint authentication apparatus. In particular, the present invention relates to a fingerprint image background detection apparatus, and detection method, for removing background regions before extracting fingerprint features from a fingerprint image.

BACKGROUND ART

Conventionally, it is necessary from the viewpoint of security to conduct person identification at the time of, for example, entering and exiting a room in a building, accessing a computer, and reception at a banking organ.

In a conventional fingerprint authentication apparatus which conducts the person identification, a fingerprint image is acquired by using a plane sensor or a line-shaped sensor using optical means, capacitance means or thermal means. A monochrome variable density image of fingerprint upheaval lines obtained by taking in a fingerprint of a finger of a discrimination subject is compared with a registered image of a fingerprint registrant to determine whether the discrimination subject is the same as the fingerprint registrant.

In image processing in such a fingerprint authentication apparatus, feature extraction is conducted on the acquired fingerprint image and collation is conducted by using an extracted feature quantity. In general, preprocessing such as noise removal and background removal is conducted on the fingerprint image before conducting the feature extraction, in order to extract a feature of the fingerprint with higher precision. The preprocessing is conducted with the object of preventing the collation precision from being lowered by false detection or a detection omission of the fingerprint feature and eliminating unnecessary processing to reduce the amount of calculation. For conducting the background removal included in the preprocessing, it is necessary to separate the subject fingerprint image into impressing regions where the fingerprint is present and background regions.

In most conventional methods of separating the fingerprint into the impressing regions and the background regions, threshold processing is conducted simply on pixel values of the fingerprint image to discriminate between the impressing regions and the background regions on the assumption that there is a significant difference in pixel value (density value) between upheaval line pixels and pixels other than upheaval lines in an input image supplied from a fingerprint input apparatus.

For example, in a method described in Patent Document 1 listed below, a high density part is transformed into a black region of pixel 1 and a low density part is transformed into a white region of pixel 0 by utilizing a density value of the input image, gradating the input image by using the Gaussian transform and temporarily converting the input image to a binary value. As a result, the black regions are discriminated as a fingerprint image part. Therefore, this part is masked and returned to the input detected image, and the white regions are cut as background information. The fingerprint image subjected to the background separation processing is subject to feature extraction processing. The background separation processing is premised on the assumption that there is a significant difference in pixel value distribution between the impressing regions and the background regions.

A method described in Patent Document 2 is not intended for a fingerprint but intended for a palm print. The impressing regions are found by extracting contour of the palm print. As for the contour of the palm print, a boundary is determined on the basis of a luminance difference between the background pixels and the palm print pixels by using scanning lines of the palm pixel image from downward, upward, rightward and leftward directions. Discrimination between upheaval line pixels and other pixels is conducted by simple threshold processing. This method is also premised on the assumption that there is a distinct difference in distribution between pixel values of upheaval lines and pixel values of the background and valley lines.

On the other hand, a method described in Patent Document 3 solves drawbacks of a method of fractionalizing a fingerprint image into small regions (blocks), utilizing the fact that there is a difference in pixel value distribution between the impressing regions and the background regions, and comparing pixel values in the small regions. In other words, proceeding to collation processing is conducted after converting the fingerprint image into binary values by using, for example, a method of using a middle value of pixel values, determining whether a fingerprint exists in the small regions obtained by the fractionalizing on the basis of continuity of upheaval lines and valley lines, and confirming that the fingerprint image is an image which does not include the background image and which is suitable for authentication.

Figure 8:
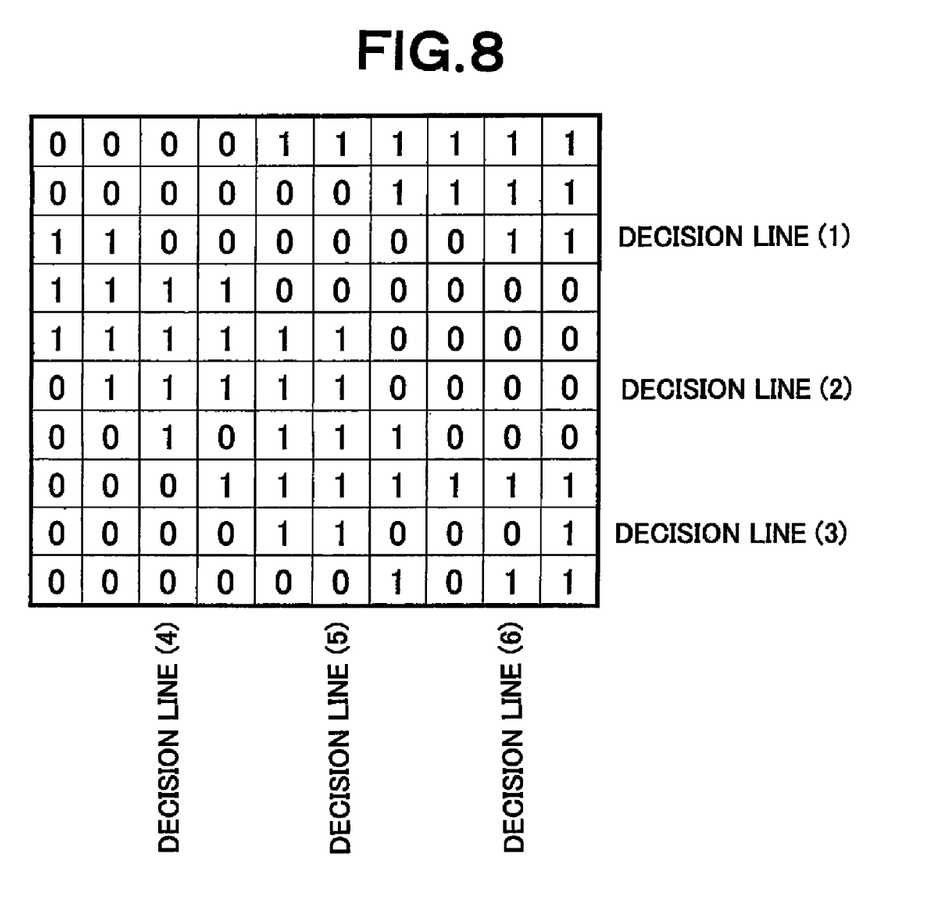
FIG. 8 is a diagram showing one region for explaining a method described in Patent Document 3.

FIG. 8 is a diagram showing one region to explain the method described in Patent Document 3.

A plurality of pixels (for example, 10 by 10 pixels) are included in one region. When a predetermined number of pixels 1 or 0 are consecutive along a decision line, the line is judged to be an upheaval line or a valley line.

Patent Document 1: Japanese Patent Application Laid-open No. 2003-44856
Patent Document 2: Japanese Patent Application Laid-open No. 10-255051
Patent Document 3: Japanese Patent Application Laid-open No. 2002-298126

DISCLOSURE OF THE INVENTION

Problems to be Solved by the Invention

The reason why simple threshold processing is used to separate the fingerprint image into the impressing regions and the background regions in the above-described conventional art is that a fingerprint image of a high quality can be obtained because the necessity to pursue a lower cost is not high in the conventional fingerprint collation apparatus and a fingerprint input apparatus of high quality can be used.

In recent years, however, the fingerprint collation apparatus is mounted on a large number of devices including personal use, and a smaller size and a lower price of the fingerprint input apparatus are demanded. As a result, fingerprint sensors degraded in quality because of the smaller size and the lowered cost increase, and the cases where fingerprint images of a poor picture quality must be handled have increased.

As an example of aggravation of the picture quality of the fingerprint image, increase of various noises such as impulsive gray-white noise and streak-like noise in a definite direction can be mentioned. There is also a fingerprint image in which the level of the pixel value cannot be kept constant in one sheet of image and there is unevenness in brightness of the background or upheaval lines. In the case of a fingerprint image acquired by using a line-shaped fingerprint sensor aiming at a smaller size, an adhered matter such as sweat or oils and fats is dragged when a finger is slid and a fingerprint image is acquired. As a result, streaks or stripe patterns are generated in the background of the fingerprint image in some cases.

Figure 9:
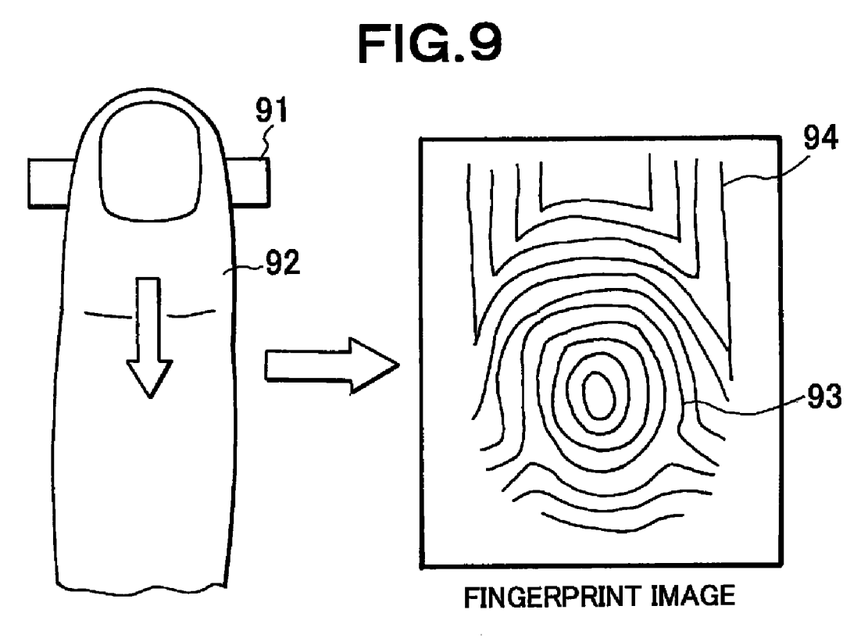
FIG. 9 is a diagram schematically showing streaks generated in a line-shaped sensor when a finger is slid and a fingerprint is acquired.

FIG. 9 is a diagram schematically showing streaks generated in the line-shaped sensor when a finger is slid and a fingerprint is acquired.

A finger 92 is brought into contact with a sensor 91 and slid downward in FIG. 9. Besides a fingerprint 93, streaks 94 are generated in the background of the fingerprint image by dragging an adhered matter such as sweat or oils and fats.

In the case where a pixel value change quantity caused by noise is small or the diameter or width of noise is very small as compared with the width of an upheaval line even if impulsive noise or streak-like noise is present, the influence of noise can be reduced remarkably by conducting smoothing using a Gaussian or median filter as conducted in the conventional art as well and it is possible to separate the fingerprint image into the background regions and the impressing regions by conducting threshold processing after the smoothing.

In some cases, however, streak-like noises having pixel values which are nearly equal in magnitude to pixel values of upheaval line pixels and also having widths which are nearly equal to widths of the upheaval lines get on. It is not rare that streak-like noises are present at intervals which are nearly equal to intervals of upheaval lines. Streaks or stripe patterns due to an adhered matter such as sweat or oils and fats generated by dragging a finger are generated by leaving an adhered matter such as sweat or oils and fats on a sensor face when an end of an upheaval line in contact with the sensor face is moved on the sensor face by sliding the finger in contact with the sensor face. Therefore, all of intervals, widths and pixels values of streaks become nearly equal to them of upheaval lines. Therefore, it is difficult to distinguish streaks caused by dragging from upheaval lines on the basis of intervals, widths and pixels of the streaks. If streak-like noise or streaks caused by dragging which resemble upheaval lines are present in the background regions, it is difficult to remove them by conducting smoothing using a Gaussian or median filter and it is difficult to separate the fingerprint image into the background regions and the impressing regions by conducting threshold processing on pixel values. In other words, although a decision is made on a fractionalized image whether a fingerprint is present on the basis of continuity of upheaval lines and valley lines in the method described in Patent Document 2 as well, there is a possibility that a background region including streak-like noise or streaks caused by dragging will be falsely judged to be an impressing region.

In this way, the conventional background separation method based on pixel values has a problem that it becomes difficult to correctly separate a fingerprint image into the background regions and the impressing regions when streak-like noise or streaks caused by dragging which resemble upheaval lines are present in the background.

Object of the Invention

An object of the present invention is to separate a fingerprint image into background regions and impressing regions without being affected by existence of streaks even if streak-like noise or streaks caused by dragging which can be hardly distinguished from upheaval lines exist.

Means for Solving the Problems

In order to solve the above-described problem, the present invention has been obtained by paying attention to the fact that intervals of streaks generated when a finger is slid on a line-shaped sensor are nearly equal to those of upheaval lines, but directions of the streaks are nearly definite directions determined by the shape of the sensor whereas directions of the upheaval lines are varied according to a part of the finger. And background removal is made possible in a fingerprint image containing streaks resulting from dragging by utilizing the fact that directions of streaks are definite and utilizing variation quantities of pixel values in a direction parallel to the streaks.

In accordance with the present invention, a fingerprint image background detection apparatus which discriminates background regions and impressing regions in an input fingerprint image includes: impressing feature extraction means for finding a pixel value variation quantity in a direction parallel to streak-like noise or streaks caused by dragging every small region obtained by dividing the input fingerprint image; tentative impressing region decision means for judging impressing regions by comparing a pixel value variation quantity of every small region found by the impressing feature extraction means with a threshold; and impressing region shaping means for shaping the impressing regions judged by the tentative impressing region decision means to obtain a convex shaped figure and obtaining regions other than the impressing regions as background regions.

In accordance with the present invention, a fingerprint image background detection method for discriminating background regions and impressing regions in an input fingerprint image includes: an impressing feature extraction process finding a pixel value variation quantity in a direction parallel to streak-like noise or streaks caused by dragging every small region obtained by dividing the input fingerprint image; a tentative impressing region decision process judging impressing regions by comparing a pixel value variation quantity of every small region found in the impressing feature extraction process with a threshold; and an impressing region shaping process shaping the impressing regions judged in the tentative impressing region decision process to obtain a convex shaped figure and obtaining regions other than the impressing regions as background regions.

Effect of the Invention

If a poor quality fingerprint image containing streak-like noise or streaks caused by dragging in a definite direction and which have widths and intervals resembling fingerprint upheaval lines is input, the present invention makes it possible to separate background regions from impressing regions with high precision by tentatively judging the impressing region on the basis of variation quantities of pixel values in a direction parallel to streak-like noise or streaks caused by dragging, for each of small regions obtained by division, then conducting shaping in the impressing regions, and finding the background regions. When the present invention is applied to fingerprint feature extraction, it is possible to prevent false detection and conduct processing efficiently.

DESCRIPTION OF REFERENCE NUMERALS

1: Input apparatus
2: Background detection apparatus
3: Output apparatus
4: Retention apparatus
5: Fingerprint feature extraction apparatus
6: Collation apparatus
7: Data processing apparatus
8: Background detection program
21: Picture quality improvement means
22: Impressing feature extraction means
23: Tentative impressing region decision means
24: Impressing region shaping means
51: Fingerprint feature extraction means
61: Collation means
7a: First data processing apparatus
7b: Second data processing apparatus
7c: Third data processing apparatus
8a: Background detection program
8b: Fingerprint feature extraction program
8c: Collation program
81: Fingerprint image divided into small regions
82: Small region for which impressing feature quantity is calculated
83: Impressing feature quantity calculated for small region
84: Impressing feature quantities calculated for all small regions
85: Results of decision as to impressing region/background region based on impressing feature quantity
86: Result of shaping
91: Sensor
92: Finger
93: Fingerprint
94: Streaks caused by dragging

BEST MODE FOR CARRYING OUT THE INVENTION

The best mode for carrying out the present invention will now be described in detail with reference to the drawings.

First Embodiment

Figure 1:
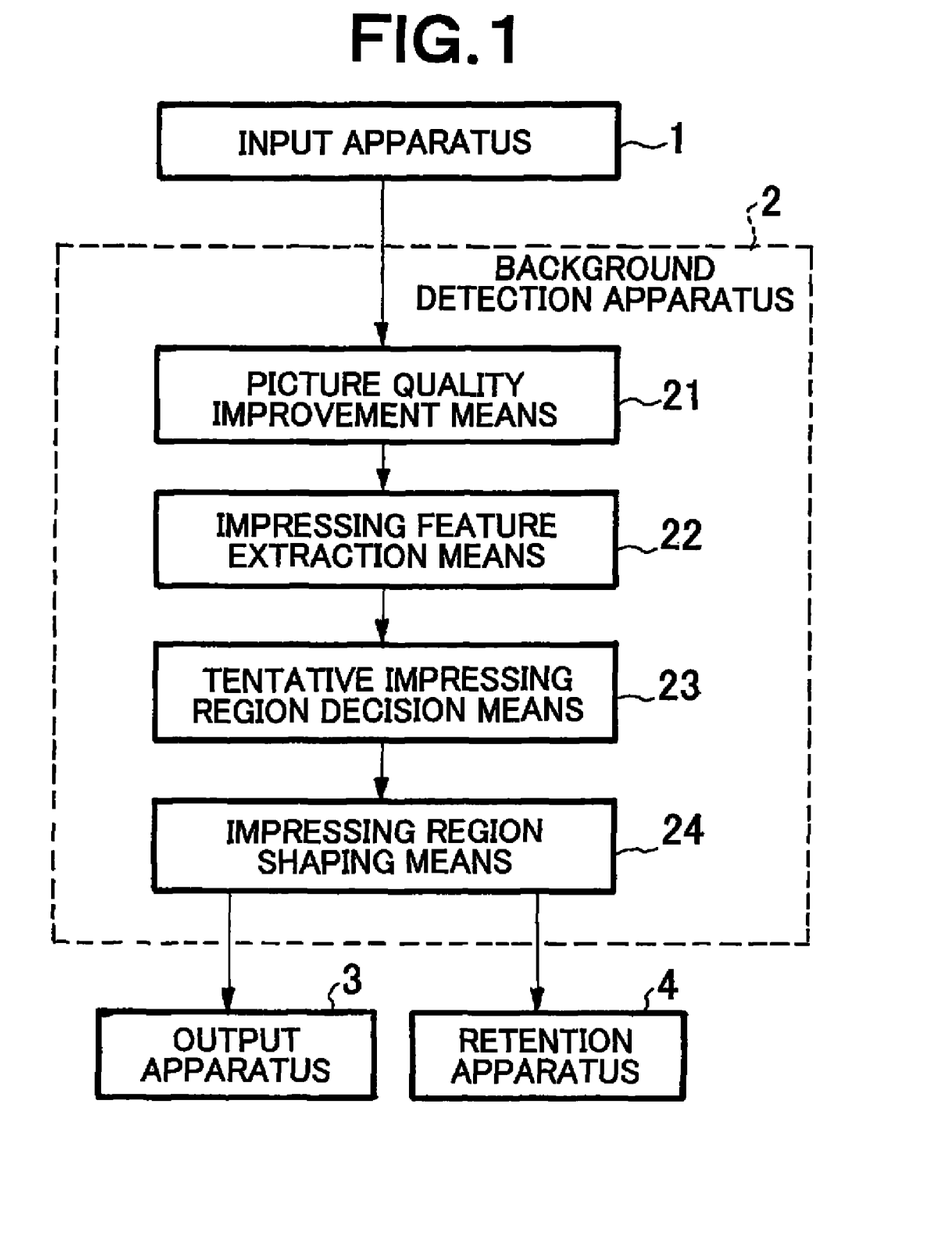
FIG. 1 is a block diagram showing an outline of a first embodiment in the present invention.

FIG. 1 is a block diagram showing an outline of a first embodiment according to the present invention.

In FIG. 1, an input apparatus 1 such as a fingerprint scanner, a background detection apparatus 2 implemented using a data processing apparatus or the like operated by program control, an output apparatus 3 such as a display apparatus, and a retention apparatus 4 which retains detected background information. The data processing apparatus includes a typical computer system formed of an arithmetic apparatus and a memory apparatus, and a program which operates on the computer system and which controls the computer system.

The background detection apparatus 2 includes picture quality improvement means 21, impressing feature extraction means 22, tentative impressing region decision means 23 and impressing region shaping means 24. The picture quality improvement means 21 conducts picture quality improvement such as noise removal. The impressing feature extraction means 22 calculates an impressing feature quantity to distinguish the impressing region from the background region. The tentative impressing region decision means 23 makes a decision whether each of small regions obtained by dividing a fingerprint image is the impressing region or the background region on the basis of the impressing feature quantity calculated by the impressing feature extraction means 22. The impressing region shaping means 24 groups small regions judged to be impressing regions by the tentative impressing region decision means 23, conducts shaping so as to cause a set of impressing regions to take a shape resembling a fingerprint, and regards regions other than the impressing regions as background regions.

General operation of the present embodiment will now be described in detail with reference to FIG. 1.

The input apparatus 1 takes in the fingerprint image as digitized data, and sends the digitized data to the background detection apparatus.

The picture quality improvement means 21 conducts picture quality improvement such as noise removal on the digitized fingerprint image supplied from the input apparatus 1 and pixel value flattening for reducing unevenness of brightness when there is remarkable unevenness of brightness in a fingerprint image, and sends the fingerprint image improved in picture quality to the impressing feature extraction means 22. The picture quality improvement means 21 is provided as occasion demands, and it can also be omitted.

Information of the direction of streak-like noise or streaks caused by dragging is supplied to the impressing feature extraction means 22 beforehand. The impressing feature extraction means 22 first calculates a pixel value change quantity in a direction parallel to the streak-like noise or streaks caused by dragging on the basis of the received fingerprint image.

For each of partial small regions obtained by dividing the fingerprint image, the impressing feature extraction means 22 calculates an impressing feature quantity of the partial small region by using a function having a pixel value variation quantity of each pixel as an argument on the basis of the variation quantity of the pixel value of each pixel in a neighboring region including a center pixel of the partial small region. As the function for calculating the impressing feature quantity of a partial small region, the square sum or absolute value sum of variation quantities of pixel values of pixels is considered. The impressing feature extraction means 22 sends the calculated impressing feature quantity of the partial small region to the tentative impressing region decision means 23.

The tentative impressing region decision means 23 makes a decision whether a partial small region is a background region or an impressing region by conducting threshold processing on the impressing feature quantity of the partial small region. The threshold may be found experimentally or calculated by using discriminant analysis beforehand. The tentative impressing region decision means 23 makes a decision whether a partial small region is a background region or an impressing region with respect to the whole image and sends its result to the impressing region shaping means 24.

The impressing region shaping means 24 groups small regions judged to be adjacent impressing regions to generate a set of impressing regions, conducts shaping such as gap filling or noise removal on the set of impressing regions obtained by grouping, generate impressing regions which take a shape resembling a fingerprint, and outputs regions other than the impressing regions as background regions.

The streak-like noise or streaks caused by dragging depend on properties of the sensor and the fingerprint acquisition method. If the sensor, the sensor attachment method and the fingerprint acquisition method are determined, streak-like noise or streaks caused by dragging are determined to be in a definite direction in all acquired images. Therefore, the direction of the streak-like noise or streaks caused by dragging is supposed to be already known. Even if streak-like noise or streaks caused by dragging exist in the fingerprint image, the pixel value change quantity in a direction parallel to the direction of the streak is zero or little. On the other hand, roughly speaking, the fingerprint is a pattern like a set of concentric ellipses arranged at nearly constant intervals. Supposing that streaks are present in the vertical direction, an upheaval line is in a direction nearly perpendicular to the streaks at the top end and the bottom end of the impressing regions. Therefore, the change quantity of the pixel value in the impressing regions in the direction parallel to the streaks becomes especially large at the top end and the bottom end of the impressing regions. No matter which direction the streaks take, the same can be said by considering that the direction of the streaks is the vertical direction.

Since the impressing regions takes the shape of a finger impressed on a plane, the impressing regions typically become a rounded closed region having no background regions in the regions. If a decision is made whether each small region is an impression region, a set of small regions judged to be impressing regions often takes a distorted shape under the influence of a false decision or noise. A background region often exists solitarily within the set of the impressing regions. Since the change quantity of the pixel value in a direction parallel to the streaks is used, a small region having an upheaval line parallel to the streaks is judged to be a background region. For example, if streaks are present in the vertical direction as described above, then the direction of an upheaval line becomes parallel to the streaks at the left and right ends of the fingerprint and the regions are regarded as the background regions. Since the fingerprint typically takes a convex shape, however, small regions judged to be background regions within an impressing region are, in general, falsely judged impressing regions. The possibility that background regions sandwiched between concave shaped impressing regions will be also impressing regions is high. Therefore, the impressing region shaping means 24 conducts processing such as gap filling of changing isolated background regions in an impressing region to impressing regions and changing background regions sandwiched between concave-shaped impressing regions to impressing regions, and noise removal of changing an impressing region having a small area isolated in a background region to a background region.

Even in an impressing region, the magnitude of a pixel value change quantity in a direction parallel to streaks become small in a region where fingerprint upheaval lines are parallel to the streaks. In the above-described example in which the streaks run in the vertical direction, the direction of upheaval lines becomes nearly parallel to the direction of the streaks in the vicinity of left and right ends of the fingerprint. Therefore, the possibility that the impressing region will be judged to be a background region is high, and it is considered that a concave shape is formed when a set of impressing regions is generated. However, regions where the probability that the regions will be judged to be impressing regions is high because upheaval lines are perpendicular to the streaks exist in the vertical ends of the fingerprint. The regions where the possibility that they will be judged to be background regions is high are sandwiched between the regions located at the vertical ends. Even if the left and right ends are judged by the tentative impressing region decision means 23 as background regions, therefore, the regions are changed to impressing regions by gap filling conducted by the impressing region shaping means 24. Also in the case where streaks are not in the vertical direction, the same can be said by regarding the direction of streaks as the vertical direction in the foregoing description.

The case where a small region in an impressing region is falsely judged to be a background region and consequently an isolated background region exists in the impressing region is also conceivable. However, the isolated background region in the impressing region is subjected to gap filling by the impressing region shaping means 24, and changed to an impressing region.

In some cases, there are small regions falsely judged to be impressing regions in a background region under the influence of noise, and a plurality of independent concatenated impressing regions are generated. In general, however, the fingerprint sensor is made according to the sizes of fingers, and a great part of the acquired fingerprint image is occupied by impressing regions. The possibility that in a fingerprint image having a true impressing region a concatenated region greater in area than the true impressing region generated by, for example, a lump of noise will exist in a background region is low. If a plurality of concatenated regions judged to be impressing regions are generated independently, it is rational to think that a concatenated impressing region having the greatest area is a correct impressing region. It poses no problem to think that concatenated regions other than the concatenated impressing region having the greatest area have been generated by noise or the like. Therefore, it is possible to remove impressing regions generated by false decisions and leave only true impressing regions by conducting the noise removal processing to erase regions other than the concatenated impressing regions having the greatest area. As a result of the processing heretofore described, the final impressing regions take a fingerprint-like shape, i.e., become convex-shaped regions.

Figure 2:
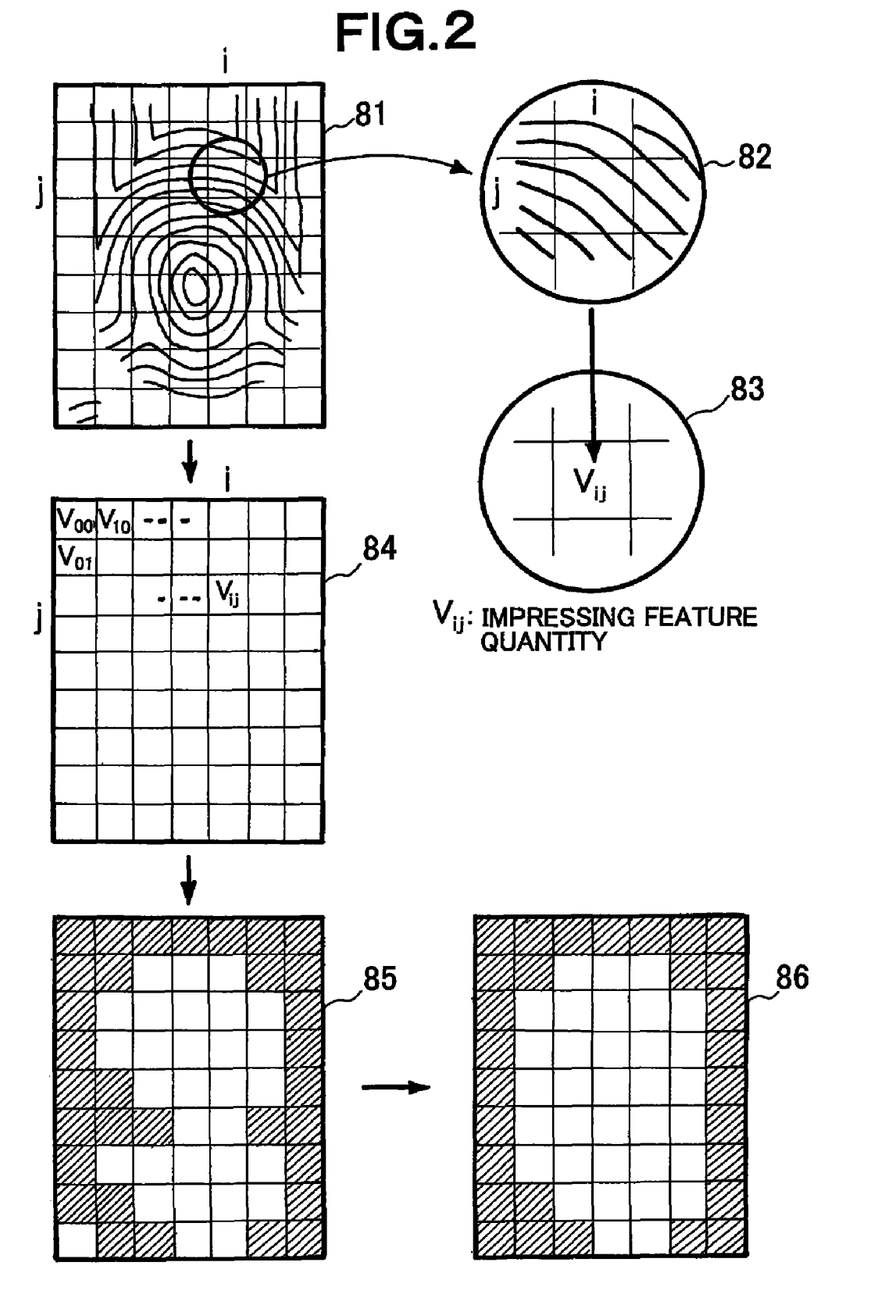
FIG. 2 is a diagram showing a rough flow of processing conducted in a background detection apparatus.

FIG. 2 is a diagram showing a rough flow of processing conducted in a background detection apparatus.

Reference numeral 81 denotes a fingerprint image obtained by dividing a fingerprint image with noise removal conducted into small regions. Reference numeral 82 denotes a small region of the jth row and the ith column for which an impressing feature quantity is to be calculated. Reference numeral 83 denotes an impressing feature quantity calculated for the small region of the jth row and the ith column in 82. Reference numeral 84 denotes an impressing feature quantity $V_{ij}$ calculated for every small region. Reference numeral 85 denotes impressing regions before shaping judged on the basis of the calculated impressing feature quantity. Reference numeral 86 denotes a result obtained by shaping the impressing regions to obtain a fingerprint-like convex shape. In 85 and 86, background regions are drawn as black small regions, whereas impressing regions are drawn as white small regions. Regions which are not changed to impressing regions by the impressing region shaping means 24 are judged to be background regions.

Information of the background regions is sent to the output apparatus 3 such as a display apparatus, displayed, and retained in the retention apparatus 4 such as a disk apparatus.

A more specific mode in the first embodiment will now be described.

With reference to FIG. 1, a fingerprint scanner having a fingerprint sensor using a prism and semiconductors mounted thereon is included as the input apparatus 1, and a display apparatus such as a display is included as the output apparatus 3. The background detection apparatus 2 includes logic circuits exclusively for the picture quality improvement means 21, the impressing feature extraction means 22, the tentative impressing region decision means 23 and the impressing region shaping means 24, or a general-purpose arithmetic operation apparatus such as a DSP or a computer, and programs which implement the respective functions.

The picture quality improvement means 21 conducts noise removal on a digitized fingerprint image input from the input apparatus 1 by using a smoothing method such as a Gaussian filter or a median filter. If there is remarkable brightness unevenness in the fingerprint image, i.e., there is a great offset in pixel value dynamic range according to the image region, the picture quality improvement means 21 conducts pixel value flattening over the whole image. According to a method conceivable as the pixel value flattening method, if, for example, the pixel value dynamic range of the image is nearly constant in the longitudinal direction, an average value of pixel values in the longitudinal direction is found for each column of the image, and a value obtained by multiplying a difference between the found average value and a predetermined goal value for the average value by a predetermined positive constant equal to or less than unity is added to the pixel value of every pixel. As each of the constant and the goal value, a suitable value is selected every sensor. If in this method the pixel value dynamic range is nearly constant in the lateral direction, longitudinal and lateral should be exchanged and a similar calculation should be conducted. If it can be said that the pixel value dynamic range is nearly constant in neither the longitudinal direction nor the lateral direction, the smoothing processing should be conducted in both the longitudinal direction and the lateral direction. If a minimum value of pixel values in each of columns for which the above-described average value is calculated is not in proportion to the average value, then every column, a value obtained by multiplying a difference between a minimum value and a predetermined goal value for the minimum value by a constant should be subtracted from all pixels in the column and then the above-described flattening processing should be conducted.

With respect to the fingerprint image subjected to the noise removal and the pixel value flattening in the picture quality improvement means 21, the impressing feature extraction means 22 calculates a pixel value variation quantity in a previously given direction parallel to streak-like noise or streaks caused by dragging. As the pixel value variation quantity in a specific direction, a magnitude of a gradient obtained by activating a linear spatial differential filter such as a Sobel filter in a direction in which the variation quantity is to be known.

For each of small regions obtained by dividing the fingerprint image, the sum of pixel value variation quantities of pixels in included in neighboring regions including the small region is calculated and the value of the calculated sum is used as the impressing feature quantity of the small region. Since the case where the pixel value variation quantity does not assume a positive value is also conceivable, the sum of absolute values or the square sum may be used as the impressing feature quantity instead of the sum of the pixel value variation quantities.

If the small region is an upheaval line region, then the pixel value greatly changes at an upheaval line, and consequently a large number of pixels having large pixel value variation quantities are distributed in the small region and the value of the impressing feature quantity becomes large. On the other hand, if the small region is a background region having no upheaval line, then a large number of pixels having small pixel value variation quantities are distributed in the small region and the value of the impressing feature quantity becomes small. If noise like an isolated point which is not removed by the picture quality improvement means 21 remains, the magnitude of the pixel value variation quantity becomes large in the vicinity of noise. If the size of the small region is suitably selected, however, the ratio of pixels having large pixel value variation quantities in the small region becomes small and the value of the impressing feature quantity also becomes small as compared with impressing regions. If streak-like noise or streaks caused by dragging are present, then the pixel value variation quantity in the direction parallel to the streaks does not become completely zero because of existence of noise or the direction deviation, but the value of the impressing feature quantity becomes small as compared with the value in the impressing regions.

The tentative impressing region decision means 23 conducts threshold processing on the impressing feature quantity $V_{ij}$ of each small region, and makes an estimation whether the small region is an impressing region or a background region. As one of the threshold processing, there is a method of using a previous found threshold as a reference, comparing the impressing feature quantity with the threshold, and making a decision whether the small region is an impressing region or a background region on the basis of a result of the comparison. It is also possible to determine a suitable threshold by a discrimination analysis such as conversion of an impress to a bi-value every input image and make a decision whether the small region is an impressing region or a background region by using the determined threshold as a reference.

The impressing region shaping means 24 first merges small regions judged to be adjacent impressing regions to generate a concatenated impressing region. If a plurality of concatenated impressing regions are obtained, concatenated impressing regions which are remarkably smaller in area than a concatenated impressing region having the largest area are eliminated as noise. If there are background regions sandwiched between remaining concatenated impressing regions, then the regions are regarded as impressing regions. If there are background regions in an impressing region at this time, then the background regions are also regarded as impressing regions. The impressing regions found by the tentative impressing region decision means 23 are thus shaped to become a convex shaped figure.

Regions finally judged to be background regions are output to the output apparatus 3 as an image. If retention is needed, the regions are retained in the retention apparatus 4 such as a disk apparatus.

Effects of the present embodiment will now be described.

In the present embodiment, the pixel value change quantity in a direction parallel to streak-like noise or streaks caused by dragging is used. As a result, it is possible to eliminate influence of streak-like noise or streaks caused by dragging which resemble upheaval lines existing in background regions and separate impressing regions in which upheaval lines exist with high precision.

Furthermore, the picture quality improvement means remove or reduce impulsive noise by using a method such as smoothing. As a result, it is possible to reduce the pixel value change quantity in the vicinity of impulsive noise pixels and reduce false decisions caused by impulsive noise.

In addition, even in the case where there is great unevenness in brightness of the fingerprint image and there is a great variation in pixel value according to a region of the image, the magnitude of the pixel value change quantity caused by unevenness becomes a very small value as compared with the magnitude of the pixel value change quantity caused by upheaval lines. Therefore, the influence of violent unevenness in brightness of the fingerprint image can be remarkably reduced by using the pixel value change quantity.

The final impressing regions take a fingerprint-like shape, i.e., a convex shape. This brings about effects described hereafter. If a decision is made whether each small region is an impressing region and neighboring impressing regions are merged to generate a concatenated region, the concatenated region often takes a distorted shape having a concave part or a hole. The concave part or hole is often a small region which exists in a true impressing region and which is judged to be a background region by a false decision. If an impressing region having a fingerprint feature is removed as the background by a false decision, then the fingerprint feature is lost. It is possible to reduce impressing regions removed as the background by a false decision by conducting shaping processing to fill a concave part or a hole of the concatenated region. It is conceivable that a small region which is actually a background region is judged to be an impressing region by a false decision in the shaping processing. In many cases, however, the small regions of the kind are small in area as compared with the area of the whole background regions. Furthermore, the processing time of the fingerprint feature extraction processing on the impressing regions is increased by falsely judging background regions as impressing regions. As compared with the loss of the fingerprint feature, however, it matters little.

Second Embodiment

Figure 3:
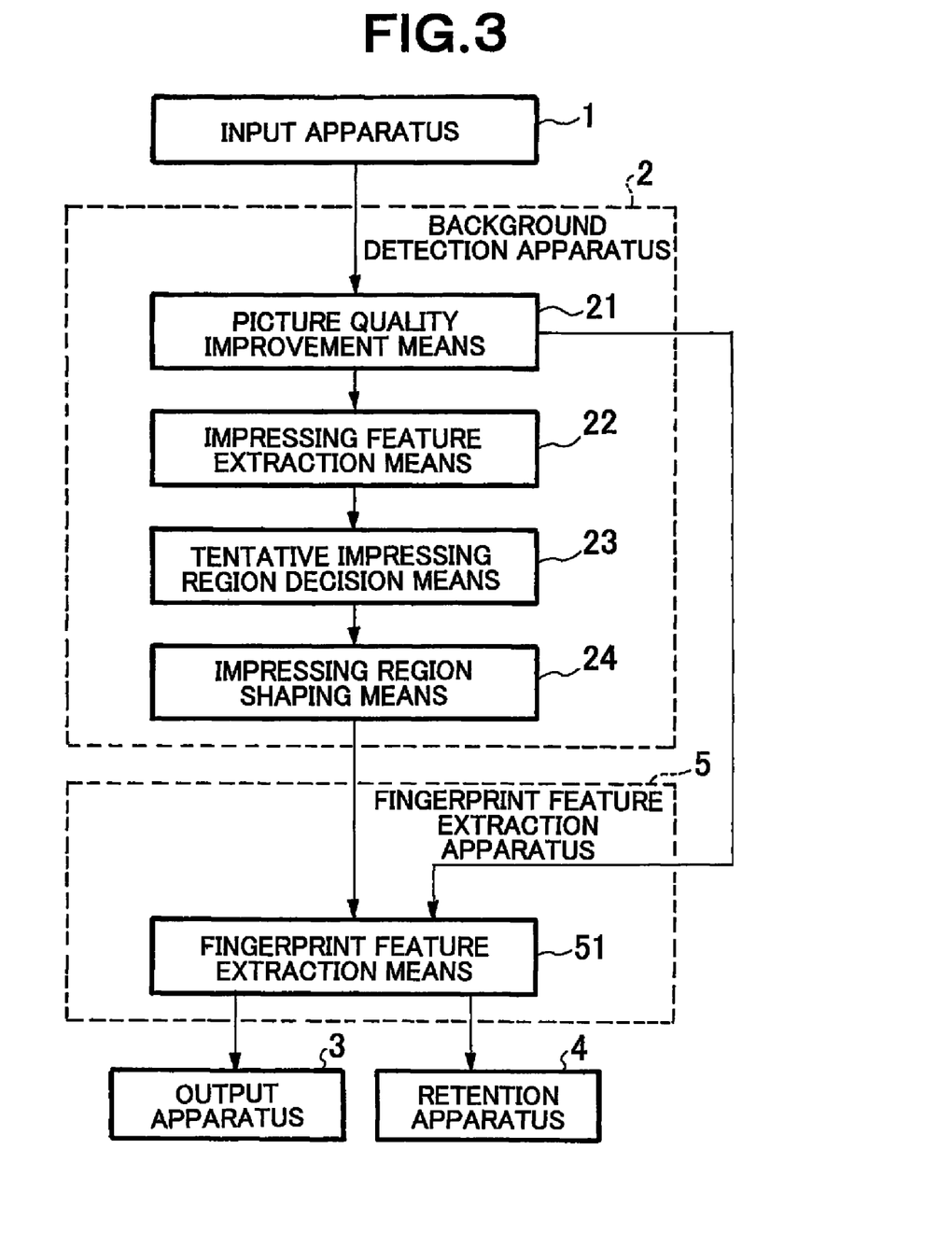
FIG. 3 is a block diagram showing an outline of a second embodiment in the present invention.

FIG. 3 is a block diagram showing an outline of a second embodiment according to the present invention.

In FIG. 3, the second embodiment includes an input apparatus 1, a background detection apparatus 2, and an output apparatus 3 in the same way as the first embodiment (FIG. 1). The background detection apparatus 2 includes picture quality improvement means 21, impressing feature extraction means 22, tentative impressing region decision means 23 and impressing region shaping means 24. The present embodiment differs from the first embodiment in that it includes a fingerprint feature extraction apparatus 5 and a retention apparatus 4.

The fingerprint feature extraction apparatus 5 includes fingerprint feature extraction means 51, and includes a data processing apparatus operated by program control. The data processing apparatus includes a computer system including an arithmetic operation apparatus and a memory device, and a program which operates on the computer system to control the computer system.

The fingerprint feature extraction means 51 receives a fingerprint image subjected to noise removal and improved in picture quality in the picture quality improvement means 21 and information of background regions output from the background detection apparatus 2, and conducts feature extraction processing on impressing regions of a fingerprint image. Extracted fingerprint feature data is sent to the output apparatus 3 including a display apparatus, and displayed thereon. The extracted fingerprint feature data is sent to the retention apparatus 4 and retained therein.

Operation of the present embodiment will now be described in detail with reference to the drawing.

Operation of the input apparatus 1 and the picture quality improvement means 21, the impressing feature extraction means 22, the tentative impressing region decision means 23 and the impressing region shaping means 24 included in the background detection apparatus 2 in the present embodiment shown in FIG. 3 is the same as the operation of the input apparatus 1 and the picture quality improvement means 21, the impressing feature extraction means 22, the tentative impressing region decision means 23 and the impressing region shaping means 24 included in the background detection apparatus 2 in the first embodiment. Therefore, description of the operation will be omitted.

The fingerprint feature extraction means 51 refers to background regions detected by the background detection apparatus 2. With respect to the fingerprint image subjected to processing such as the noise removal and received from the picture quality improvement means 21, the fingerprint feature extraction means 51 does not conduct the feature extraction on regions judged to be background regions, but conducts the feature extraction only on regions judged to be impressing regions, extracts a fingerprint feature, and outputs the fingerprint feature to the output apparatus 3. Furthermore, the fingerprint feature extraction means 51 retains the fingerprint feature data in the retention apparatus 4.

A more specific aspect in the second embodiment will now be described.

The present embodiment is a fingerprint feature extraction system utilizing information of the background regions The background detection apparatus according to the present embodiment has the same configuration as that of the first embodiment. The present embodiment differs from the first embodiment in that the fingerprint feature extraction apparatus is included and a fingerprint image improved in picture quality is sent from the picture quality improvement means to the fingerprint feature extraction apparatus, that the background detection result is sent from the background detection apparatus to the fingerprint feature extraction apparatus, and that the fingerprint feature extraction apparatus extracts a fingerprint feature from the fingerprint image and the background detection result.

The fingerprint feature extraction apparatus includes logic circuits exclusively for the function of the fingerprint feature extraction means, or a general purpose arithmetic operation apparatus such as a computer or a DSP and a program for implementing the function of the fingerprint feature extraction means. The background detection apparatus and the fingerprint feature extraction apparatus may be different devices or may be constituted as one device including logic circuits exclusively for functions of the respective apparatuses therein. Or the background detection apparatus and the fingerprint feature extraction apparatus may include one general purpose arithmetic operation apparatus and programs implementing functions of the background detection apparatus and the function of the fingerprint feature extraction apparatus.

The background detection apparatus sends an image subjected to noise removal in the picture quality improvement means and information of the detected background region to the fingerprint feature extraction apparatus.

The fingerprint feature extraction means utilizes the received information of the background region and conducts the fingerprint feature extraction processing only on impressing regions of the fingerprint image. The algorithm for fingerprint feature extraction is arbitrary. The extracted fingerprint feature is sent to and retained in the retention apparatus such as a disk apparatus, if necessary, and sent to the output apparatus such as a display apparatus and displayed thereon.

Effects of the present embodiment will now be described.

Even if a fingerprint image includes streak-like noise or streaks caused by dragging which take shapes resembling upheaval lines, the background regions and the impressing regions can be separated with high precision in the present embodiment in the same way as the first embodiment. In addition, in the present embodiment, the fingerprint feature extraction processing is conducted only on the impressing regions, and the fingerprint feature extraction processing on the background regions can be saved. As a result, it is possible to prevent false detection of a fingerprint feature caused by false recognition of streak-like noise or streaks caused by dragging as upheaval lines and which are present in the background or false recognition of other patterns or noise as a fingerprint feature. At the same time, it is possible to save useless processing and shorten the processing time by refraining from the fingerprint feature extraction processing on the background regions.

Third Embodiment

Figure 4:
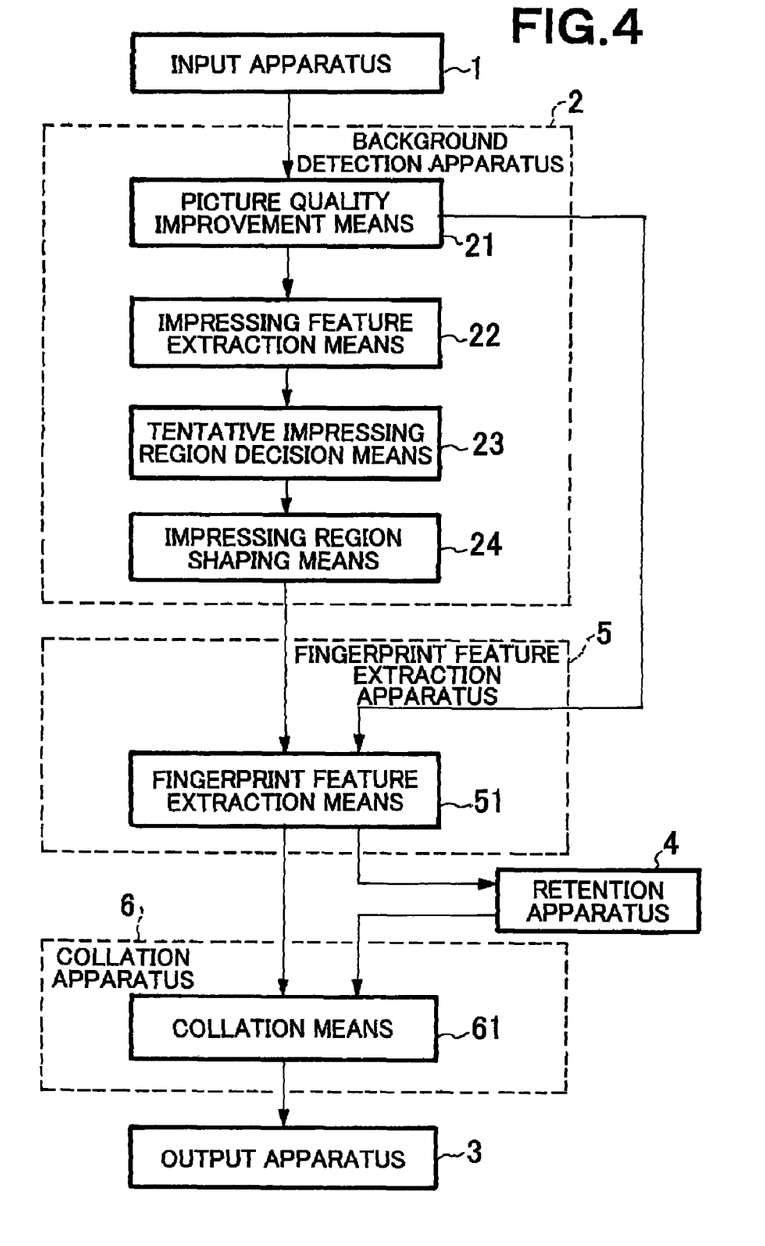
FIG. 4 is a block diagram showing an outline of a third embodiment in the present invention.

FIG. 4 is a block diagram showing an outline of a third embodiment according to the present invention.

In FIG. 4, the third embodiment includes an input apparatus 1, a background detection apparatus 2, a fingerprint feature extraction apparatus 5, a retention apparatus 4, and an output apparatus 3 in the same way as the second embodiment. The background detection apparatus 2 includes picture quality improvement means 21, impressing feature extraction means 22, tentative impressing region decision means 23 and impressing region shaping means 24. The present embodiment differs from the second embodiment in that it includes a collation apparatus 6.

The collation apparatus 6 collates fingerprint feature data extracted by the fingerprint feature extraction apparatus 5 with fingerprint feature data retained in the retention apparatus 4, and displays a result of the collation on the output apparatus 3.

The collation apparatus 6 includes a data processing apparatus or the like operated by program control, and includes collation means 61. The data processing apparatus includes a computer system including an arithmetic operation apparatus and a memory device, and a program which operates on the computer system to control the computer system.

Operation of the present embodiment will now be described in detail with reference to the drawing.

Operation of the input apparatus 1, the background detection apparatus 2, and the fingerprint feature extraction apparatus 5 shown in FIG. 4 is the same as the operation of the respective apparatuses in the second embodiment (FIG. 3). Therefore, description of the operation will be omitted. A plurality of fingerprint feature data extracted by the fingerprint feature extraction apparatus 5 are stored in the retention apparatus 4 beforehand. The collation means 61 collates the fingerprint feature data retained in the retention apparatus 4 with the fingerprint feature data extracted by the fingerprint feature extraction apparatus 5 and sent to the collation means 61. When conducting one-to-one collation, specific fingerprint feature data is read out from the retention apparatus and collated with the fingerprint feature data sent from the fingerprint feature extraction apparatus 5, a decision is made whether fingerprints are fingerprints of the same finger or fingerprints of different fingers, and a result of the decision is displayed on the output apparatus 3. When conducting one-to-many collation, a plurality of fingerprint feature data to be collated is read out from the retention apparatus, and respective data are collated with fingerprint feature data sent from the fingerprint feature extraction apparatus 5 to search for a fingerprint image judged to be an image of the same finger. If there is a fingerprint image judged to be an image of the same finger, then a fingerprint that coincides in feature the best is judged to be the fingerprint of the same finger as the finger of the fingerprint image to be searched for, and a result is displayed on the output apparatus 3.

A more specific aspect in the third embodiment will now be described.

A configuration in the present embodiment includes a fingerprint collation apparatus in addition to the configuration in the second embodiment. The configuration in the present embodiment differs from the configuration in the second embodiment in that the output apparatus displays the result of the fingerprint collation.

When registering a fingerprint in the present embodiment, a fingerprint feature extracted by the fingerprint feature extraction apparatus is retained as data in the retention apparatus such as a disk apparatus.

When conducting fingerprint authentication, the fingerprint collation apparatus collates a fingerprint feature extracted by the fingerprint feature extraction apparatus with a fingerprint feature read out from the disk as a collation subject. The algorithm of the fingerprint collation is arbitrary.

A result of the collation is displayed on the output apparatus such as a display apparatus.

Effects of the present embodiment will now be described.

In the present embodiment, in addition, false fingerprint feature detections can be reduced besides the effects of the second embodiment. At the time of fingerprint collation, therefore, false decisions caused by false fingerprint feature detection are reduced and it is possible to reduce the ratio of refusing the person having identity and the different person acceptance ratio.

In other words, falsely detected fingerprint features causing precision lowering in the collation processing are decreased and the collation precision is improved. Furthermore, since the fingerprint feature extraction processing is not conducted on the background regions, the processing time of the fingerprint feature extraction decreases and fingerprint features falsely detected in the background regions can be removed. As a result, the quantity of fingerprint features used in the collation processing decreases, and the collation processing time decreases.

Fourth Embodiment

Figure 5:
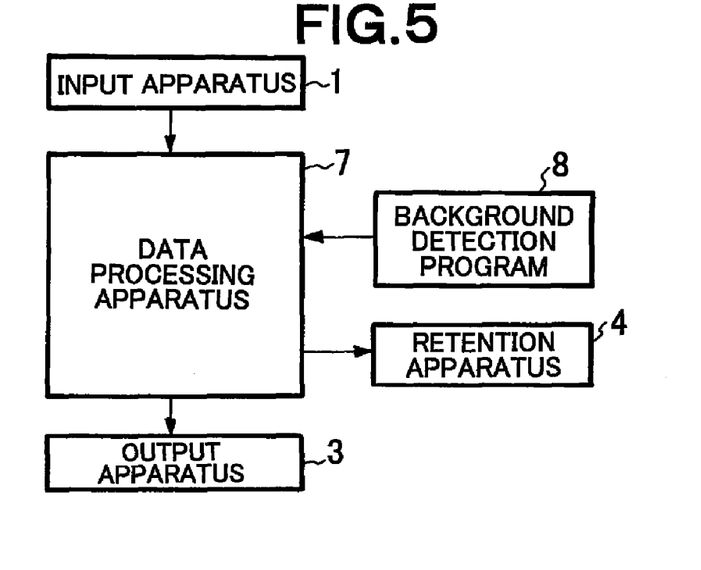
FIG. 5 is a block diagram showing an outline of a fourth embodiment in the present invention.

FIG. 5 is a block diagram showing an outline of a fourth embodiment according to the present invention.

In FIG. 5, the fourth embodiment according to the present invention corresponds to the first embodiment, and includes an input apparatus 1, an output apparatus 3, a retention apparatus 4, and a data processing apparatus 7.

A background detection program 8 is read into the data processing apparatus 7 to control operation of the data processing apparatus 7. Under control of the background detection program, the data processing apparatus 7 executes the same processing as that conducted by the background detection apparatus 2 in the first embodiment.

Fifth Embodiment

Figure 6:
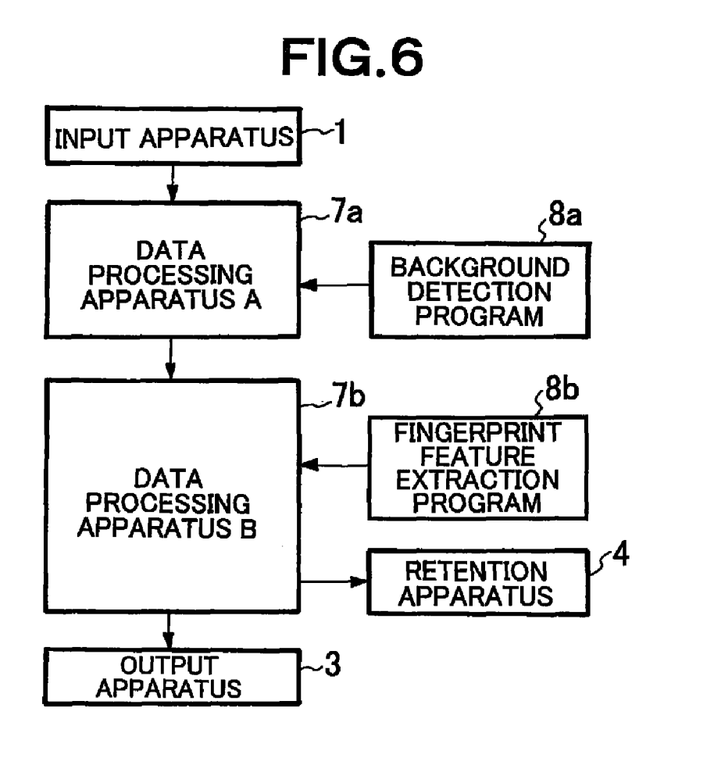
FIG. 6 is a block diagram showing an outline of a fifth embodiment in the present invention.

FIG. 6 is a block diagram showing an outline of a fifth embodiment according to the present invention.

In FIG. 6, the fifth embodiment according to the present invention corresponds to the second embodiment, and includes an input apparatus 1, an output apparatus 3, a retention apparatus 4, a first data processing apparatus 7a, and a second data processing apparatus 7b.

A background detection program 8a is read into the first data processing apparatus 7a to control operation of the first data processing apparatus 7a. Under control of the background detection program, the first data processing apparatus 7a executes the same processing as that conducted by the background detection apparatus 2 in the second embodiment.

A fingerprint feature extraction program 8b is read into the second data processing apparatus 7b to control operation of the second data processing apparatus 7b. Under control of the fingerprint feature extraction program, the second data processing apparatus 7b executes the same processing as that conducted by the fingerprint feature extraction apparatus 5 in the second embodiment.

The first data processing apparatus 7a and the second data processing apparatus 7b may be different data processing apparatuses, or may be the same data processing apparatus.

Sixth Embodiment

Figure 7:
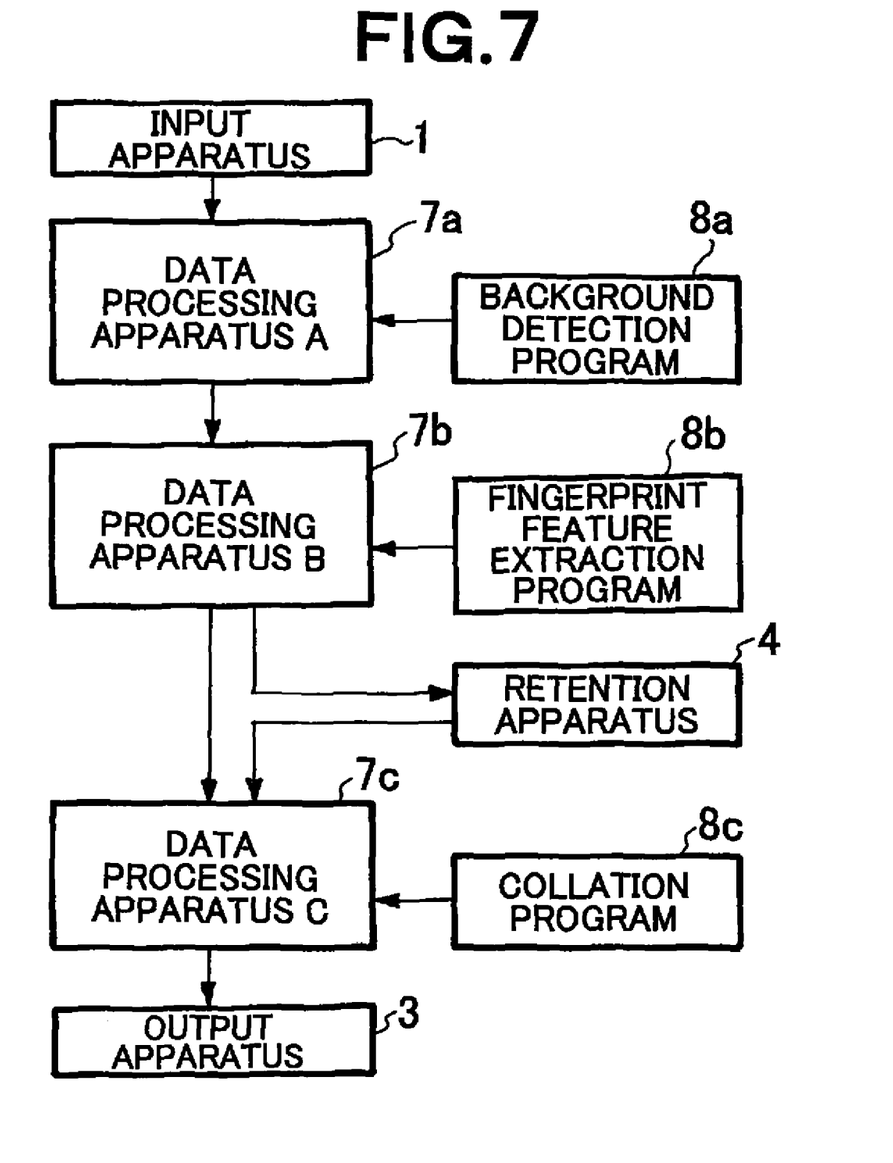
FIG. 7 is a block diagram showing an outline of a sixth embodiment in the present invention.

FIG. 7 is a block diagram showing an outline of a sixth embodiment according to the present invention.

In FIG. 7, the sixth embodiment according to the present invention corresponds to the third embodiment, and includes an input apparatus 1, an output apparatus 3, a retention apparatus 4, a first data processing apparatus 7a, a second data processing apparatus 7b, and a third data processing apparatus 7c.

A background detection program 8a is read into the first data processing apparatus 7a to control operation of the first data processing apparatus 7a. Under control of the background detection program 8a, the first data processing apparatus 7a executes the same processing as that conducted by the background detection apparatus 2 in the third embodiment.

A fingerprint feature extraction program 8b is read into the second data processing apparatus 7b to control operation of the second data processing apparatus 7b. Under control of the fingerprint feature extraction program 8b, the second data processing apparatus 7b executes the same processing as that conducted by the fingerprint feature extraction apparatus 5 in the third embodiment.

A collation program 8c is read into the third data processing apparatus 7c to control operation of the third data processing apparatus 7c. Under control of the collation program 8c, the third data processing apparatus 7c executes the same processing as that conducted by the collation apparatus 6 in the third embodiment.

The first data processing apparatus 7a, the second data processing apparatus 7b, and the third data processing apparatus 7c may be different data processing apparatuses, or may be the same data processing apparatus.

INDUSTRIAL APPLICABILITY

In a door control apparatus and a gate control apparatus, the present invention can be applied to a person's identity authentication apparatus using fingerprint collation in authentication for releasing lock and a program for implementing the person's identity authentication apparatus. In a portable terminal such as a PDA or a portable telephone, a computer apparatus such as a PC, or a terminal, the present invention can be applied to a person's identity authentication apparatus for conducting authentication when conducting log-in or lock release or utilizing an EC or the like using fingerprint collation instead of authentication means such as a secret identification number or a password, and a program for implementing such a person's identity authentication apparatus. In an ATM installed in a bank, a post office or a convenience store, the present invention can be applied to an authentication apparatus for conducting person's identity authentication and a program for implementing such an authentication apparatus.

The invention claimed is:

1. A fingerprint image background detection apparatus which discriminates background regions and impressing regions in an input fingerprint image, the fingerprint image background detection apparatus comprising:
    an impressing feature extraction unit that calculates an impressing feature quantity for every small region obtained by dividing the input fingerprint image, the impressing feature quantity being calculated based on spatial variation quantities of pixel values in each small region in a direction parallel to streak-like noise in the input fingerprint image, the input fingerprint image having been generated by a fingerprint pattern on a finger when the finger is slid on a fingerprint sensor, and the streak-like noise having been caused by dragging matter adhered to the finger when the finger is slid on the fingerprint sensor;
    a tentative impressing region decision unit that judges whether each small region is an impressing region or not by comparing with a threshold the impressing feature quantity calculated by the impressing feature extraction unit, and the impressing region being a region where a part or all of a fingerprint patter is present; and
    an impressing region shaping unit that shapes the impressing regions judged by the tentative impressing region decision unit to obtain a convex shaped figure by modifying a part of the judgments made by the decision unit about whether each small region is an impressing region or not and obtains regions other than the impressing regions as background regions.

2. The fingerprint image background detection apparatus according to claim 1, wherein when there are a plurality of independent impressing regions, the impressing region shaping unit judges regions other than a maximum impressing region to be background regions.

3. The fingerprint image background detection apparatus according to claim 2, wherein when there are background regions sandwiched between impressing regions, the impressing region shaping unit judges the background regions to be impressing regions.

4. The fingerprint image background detection apparatus according to claim 1 further comprises a picture quality improvement unit conducting noise removal or noise reduction on the input fingerprint image.

5. A system comprising:
    a fingerprint image background detection apparatus according to claim 1; and
    a fingerprint feature extraction unit that conducts fingerprint feature extraction on impressing regions on the basis of the input fingerprint image or a fingerprint image found by the picture quality improvement unit and background regions found by the impressing region shaping unit.

6. A system according to claim 5 further comprises a collation unit that collates fingerprint feature data found by the fingerprint feature extraction means with fingerprint feature data retained in a retention apparatus.

7. A fingerprint image background detection method for discriminating background regions and impressing regions in an input fingerprint image, the fingerprint image background detection method comprising:
- an impressing feature extraction process calculating an impressing feature quantity for every small region obtained by dividing the input fingerprint image, the impressing feature quantity being calculated based on spatial variation quantities of pixel values in each small region in a direction parallel to streak-like noise in the input fingerprint image, the input fingerprint image having been generated by a fingerprint pattern on a finger when the finger is slid on a fingerprint sensor, and the streak-like noise having been caused by dragging matter adhered to the finger when the finger is slid on the fingerprint sensor;
- a tentative impressing region decision process judging whether each small region is an impressing region or not by comparing with a threshold the impressing feature quantity calculated in the impressing feature extraction process, and the impressing region being a region where a part or all of a fingerprint pattern is present; and
- an impressing region shaping process shaping the impressing regions judged in the tentative impressing region decision process to obtain a convex shaped figure by modifying a part of the judgments made in the decision process about whether each small region is an impressing region or not, and obtaining regions other than the impressing regions as background regions.

8. A non-transitory computer-readable medium carrying a program causing a computer to execute the fingerprint image background detection method according to claim 7.

9. An apparatus which discriminates impressing regions in an input fingerprint image, the apparatus comprising:
- an impressing feature extraction unit that calculates an impressing feature quantity for every small region obtained by dividing the input fingerprint image, the impressing feature quantity being calculated base on spatial variation quantities of pixel values in each small region in a direction parallel to streak-like noise in the input fingerprint image, the input fingerprint image having been generated by a fingerprint pattern on a finger when the finger is slid on a fingerprint sensor, and the streak-like noise having been caused by dragging matter adhered to the finger when the finger is slid on the fingerprint sensor; and
- a tentative impressing region decision unit that judges whether each small region is an impressing region or not by comparing with a threshold the impressing feature quantity calculated by the impressing feature extraction unit, and the impressing region being a region where a part or all of a fingerprint pattern is present.

10. An apparatus according to claim 9, further comprises a fingerprint feature extraction unit extracting fingerprint feature data from impressing regions of the input fingerprint image.

11. An apparatus according to claim 10 further comprises a collation unit collating the extracted fingerprint feature data with previously prepared fingerprint feature data.

12. A method for discriminating impressing regions in an input fingerprint image, the method comprising:
- an impressing feature extraction process calculating an impressing feature quantity for every small region obtained by dividing the input fingerprint image, the impressing feature quantity being calculated based on spatial variation quantities of pixel values in each small region in a direction parallel to streak-like noise in the input fingerprint image, the input fingerprint image having been generated by a fingerprint pattern on a finger when the finger is slid on a fingerprint sensor, and the streak-like noise having been caused by dragging matter adhered to the finger when the finger is slid on the fingerprint sensor; and
- a tentative impressing region decision process judging whether each small region is an impressing region or not by comparing with a threshold the impressing feature quantity calculated in the impressing feature extraction process, and the impressing region being a region where a part or all of a fingerprint pattern is present.

13. A method according to claim 12 further comprises a fingerprint feature extraction process extracting fingerprint feature data from impressing regions of the input fingerprint image.

14. A method according to claim 13 further comprises a collation process collating the extracted fingerprint feature data with previously prepared fingerprint feature data.

15. A non-transitory computer-readable medium carrying a program causing a computer to execute fingerprint image discrimination processing to discriminate impressing regions in an input fingerprint image, wherein the fingerprint image discrimination processing comprises:
- impressing feature extraction processing calculating an impressing feature quantity for every small region obtained by dividing the input fingerprint image, the impressing feature quantity being calculated based on spatial variation quantities of pixel values in each small region in a direction parallel to streak-like noise in the input fingerprint image, the input fingerprint image having been generated by a fingerprint pattern on a finger when the finger is slid on a fingerprint sensor, and the streak-like noise having been caused by dragging matter adhered to the finger when the finger is slid on the fingerprint sensor; and
- tentative impressing region decision processing judging whether each small region is an impressing region or not by comparing with a threshold the impressing feature quantity calculated by the impressing feature extraction processing, and the impressing region being a region where a part or all of a fingerprint pattern is present.

16. The non-transitory computer-readable medium carrying a program according to claim 15 further comprising fingerprint feature extraction processing extracting fingerprint feature data from impressing regions of the input fingerprint image.

17. The non-transitory computer-readable medium carrying a program according to claim 16 further comprising collation processing collating the extracted fingerprint feature data with previously prepared fingerprint feature data.

* * * * *

UNITED STATES PATENT AND TRADEMARK OFFICE
CERTIFICATE OF CORRECTION

PATENT NO.        : 8,385,612 B2                                                              Page 1 of 1
APPLICATION NO.   : 11/994220
DATED             : February 26, 2013
INVENTOR(S)       : Tetsuo Tatara It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1203 days.

Signed and Sealed this
First Day of September, 2015

Michelle K. Lee
*Director of the United States Patent and Trademark Office*